(12) United States Patent
Kouda et al.

(10) Patent No.: US 6,827,567 B2
(45) Date of Patent: Dec. 7, 2004

(54) POWDER COMPRESSION MOLDING METHOD AND APPARATUS AND DRY CELL

(75) Inventors: Minoru Kouda, Hirakata (JP); Shigeharu Hattori, Moriguchi (JP); Saburo Nakatsuka, Kyoto (JP); Hiroshi Takebayashi, Hirakata (JP); Toshio Sanukiya, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/770,023

(22) Filed: Jan. 25, 2001

(65) Prior Publication Data

US 2001/0006265 A1 Jul. 5, 2001

Related U.S. Application Data

(62) Division of application No. 08/957,413, filed on Oct. 24, 1997, now abandoned.

(30) Foreign Application Priority Data

Nov. 14, 1996 (JP) .............................................. 8-302960
Nov. 14, 1996 (JP) .............................................. 8-302961

(51) Int. Cl.$^7$ .............................................. B29C 43/34
(52) U.S. Cl. ..................... 425/78; 425/345; 425/353; 29/623.1
(58) Field of Search ..................... 425/78, 345, 344, 425/352, 353, 355; 29/623, 623.1, 623.5

(56) References Cited

U.S. PATENT DOCUMENTS 2,946,298 A * 7/1960 Doepel et al. .............. 425/345
2,963,993 A * 12/1960 Stott ........................ 425/126.1
3,337,915 A    8/1967 Alexander, Jr.
3,577,842 A * 5/1971 Nakai et al. ................... 425/78
3,729,281 A * 4/1973 Okubo et al. ................ 425/355
3,752,622 A    8/1973 Viadana
3,773,446 A   11/1973 Borrini
4,008,021 A    2/1977 Fedrigo et al.
4,168,137 A    9/1979 McLain et al.
4,352,648 A * 10/1982 Hilton ......................... 425/78
4,392,800 A    7/1983 Apuzzo
5,036,581 A * 8/1991 Ribordy et al. .............. 425/116
5,662,849 A * 9/1997 Bogue et al. ................ 425/350
5,698,238 A   12/1997 Fabbri
5,874,114 A    2/1999 Schrofele

FOREIGN PATENT DOCUMENTS

| JP | 0613270 | 4/1926 |
| JP | 481832  | 2/1994 |
| JP | 4109936 | 2/1994 |
| JP | 4206052 | 2/1994 |

* cited by examiner

Primary Examiner—Robert Davis
Assistant Examiner—Thu Kanh T. Nguyen

(57) ABSTRACT

Powder mixture is supplied into a die under a state that a center pin is located lower than the top surface of the die, after which the center pin is lifted up to a given molding position where an annular molding space is defined between the center pin and the die. The powder mixture is then compressed from upper and lower sides with an upper plunger and a lower plunger to form a pellet. The center pin and the lower plunger are simultaneously lifted up to remove the pellet out of the die.

22 Claims, 13 Drawing Sheets

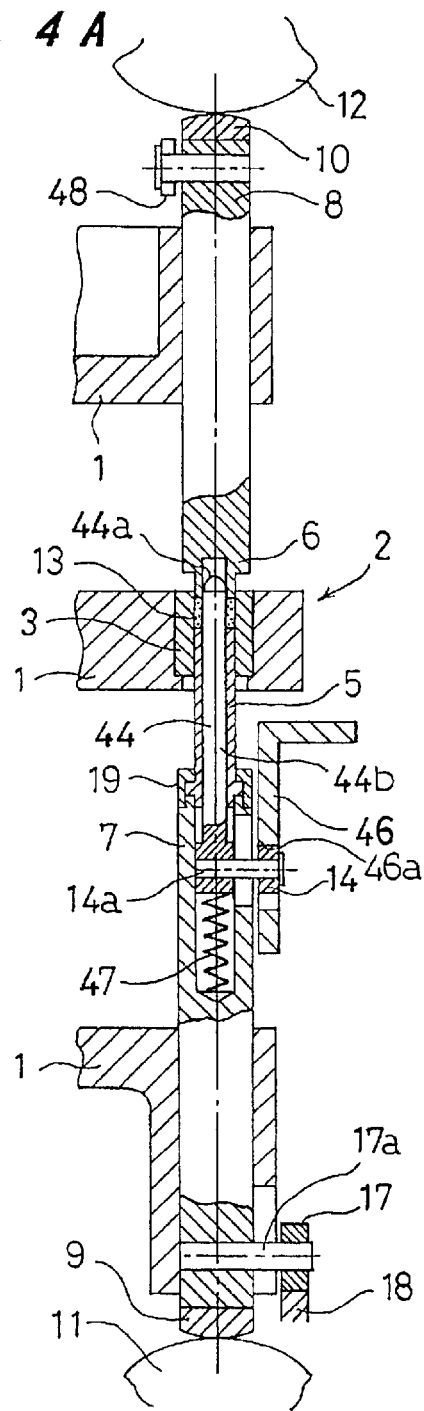
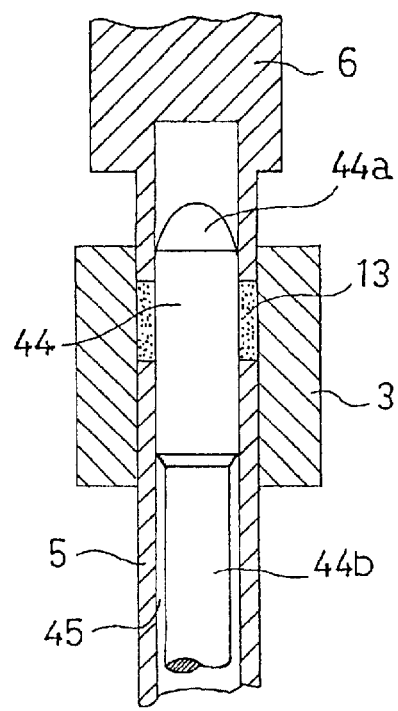
Fig. 4A
Fig. 4B

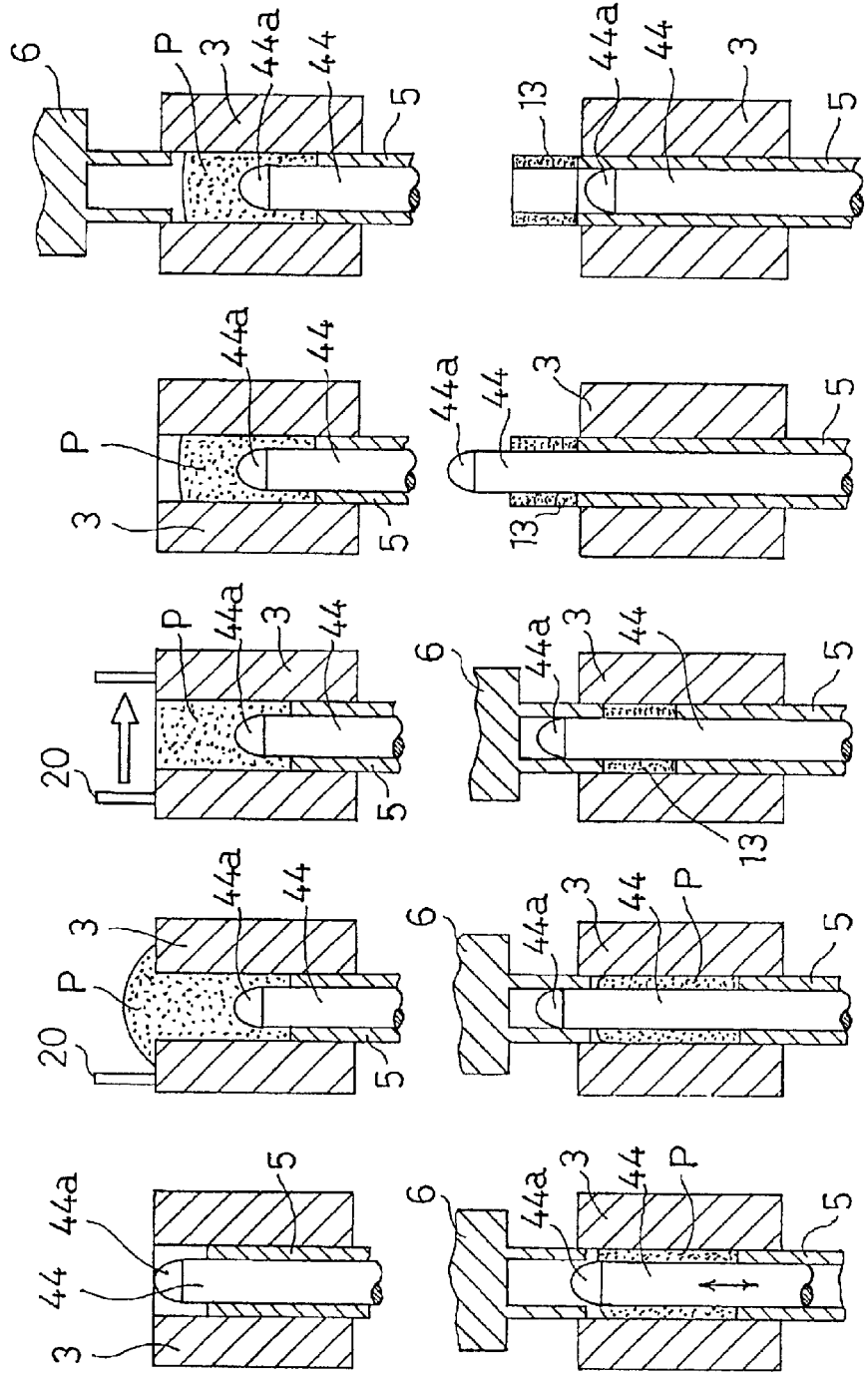

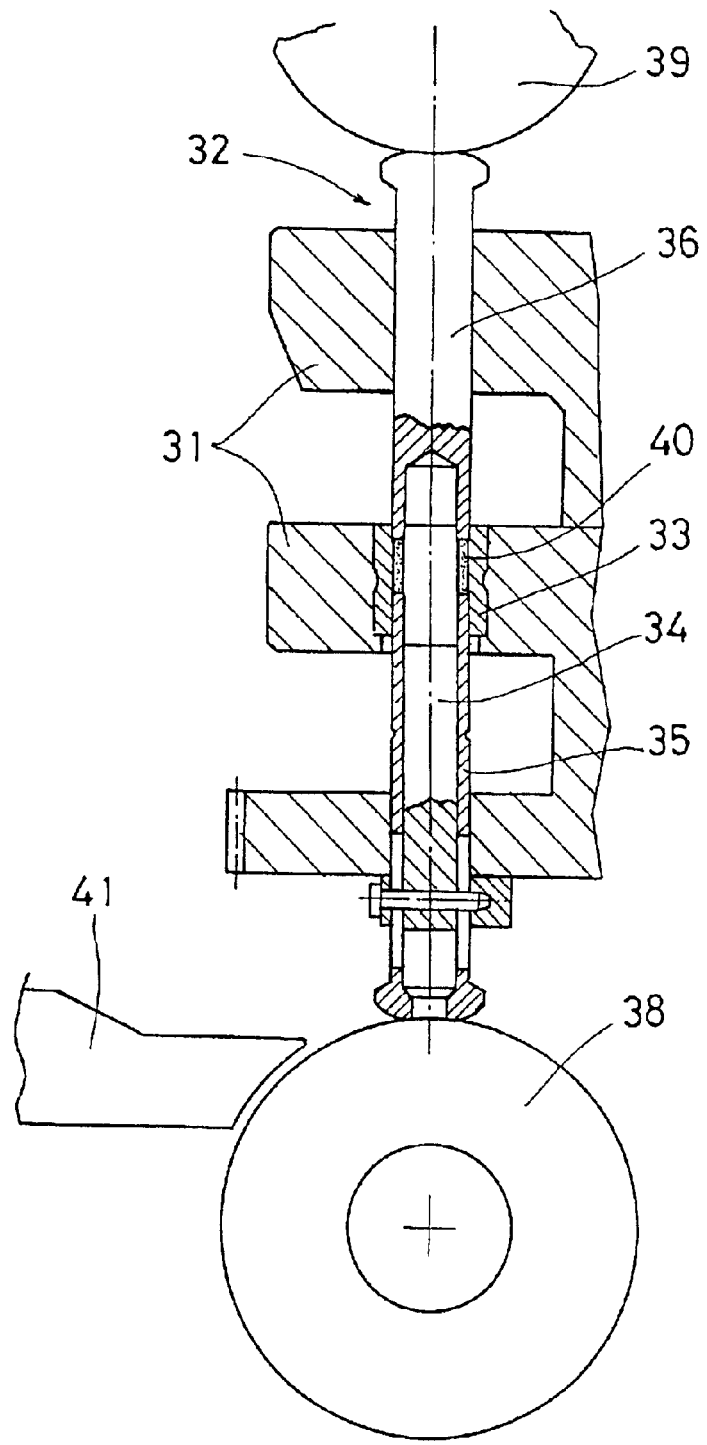

POWDER COMPRESSION MOLDING METHOD AND APPARATUS AND DRY CELL

This is a divisional of application Ser. No. 08/957,413, filed Oct. 24, 1997, now abandoned.

BACKGROUND OF THE INVENTION

1. Technical Field of the Invention

The present invention relates to a method and an apparatus for compression molding of a mixture of powder materials to manufacture ring-like pellets and to a dry cell, such as an alkaline-manganese dry cell, which contains pellets made of the powder mixture produced by the method and apparatus.

2. Description of Related Art

The market for alkaline-manganese dry cells has sharply been expanded with the spread of portable electronic appliances such as personal computers which consume a large amount of power. Alkaline-manganese dry cells which contain pellets made from a powder mixture are classified into six different types ranging from the standard R20 (D type) to a rectangular 9-Volt cell and are all fabricated in the form of a ring. These pellets are manufactured by compressing a mixture of powder materials in a ring-like mold with a compression molding machine, and hermetically loaded in a cell case.

The molding of such mixture pellets is generally performed with a rotary type compression molding machine as disclosed in Japanese Published Unexamined Patent Application No. 6-23597 or Japanese Published Utility Model Application No. 6-23694. The rotary compression molding machine of such type comprises a rotary disk 53 mounted by a bearing unit 52 to a center shaft 51 and driven by a drive unit 54 for rotation about the center shaft 51, as shown in FIG. 10. The rotary disk 53 carries at its circumferential edge a number of molding units 55 arranged at equal intervals. The molding unit 55 consists of a die 56, a lower plunger 57, and an upper plunger 58. After the powder material is supplied into the die 56 as the rotary disk 53 is rotated, it is compressed with the vertical movements of the lower plunger 57 and the upper plunger 58 which are actuated at predetermined locations by a lower pressing roller 59a and an upper pressing roller 59b, respectively. The formed pellet is pressed out and ejected from the die 56 by the upward movement of the lower plunger 57 which is actuated by a cam 60.

The conventional rotary compression molding machines disclosed in the above mentioned publications are designed for forming disk-like pellets. For molding a ring-like pellet, the die has to be replaced with an appropriate one equipped with a center pin.

A forming operation in a conventional rotary compression molding machine being constructed as mentioned above is now explained referring to FIGS. 11 and 12. As shown in a longitudinal sectional view of the rotary compression molding machine of FIG. 11, a rotary disk 31 has a plurality of molding units 32 arranged at equal intervals on a concentric circle about the center of rotation. Each molding unit 32 comprises a die 33, a center pin 34, a lower plunger 35, and an upper plunger 36. The die 33 is fixed to the rotary disk 31 and the center pin 34 is fitted into an axial bore of the lower plunger 35 for sliding movement in relation to the lower plunger 35. The lower plunger 35 and the upper plunger 36 are arranged to engage with a lower pressing roller 38 and an upper pressing roller 39 respectively at their corresponding locations as the rotary disk 31 is rotated so as to compress the powder material filled in an annular space between the die 33 and the center pin 34 from upper and lower sides to form a ring-like pellet 40. The molded ring-like pellet 40 is then pressed upwardly out from the die 33 by the lower plunger 35 which is greatly lifted up by the engagement with a cam 41.

A procedure of forming the pellet 40 with the rotary compression molding machine described above is explained in more detail referring to FIG. 12. FIG. 12A illustrates an initial state where the die 33, the lower plunger 35, and the center pin 34 are flush with each other at the top after the previous pellet 40 is unloaded. When the lower plunger 35 is lowered from its initial position, an annular space for compression molding is formed between the die 33 and the center pin 34 as shown in FIG. 12B. The annular space is then filled with a powder material 42. As a feed shoe 43 runs along the top sides of the die 33 and the center pin 34 located flush with each other, an excess of the powder material 42 is removed to measure out a predetermined amount to be molded into one pellet 40. This is followed by a step where the lower plunger 35 is lifted up and the upper plunger 36 is lowered as shown in FIG. 12D, by which the powder material 42 in the annular space is compressed from upper and lower sides, thus forming the pellet 40. The pellet 40 is then unloaded upwardly from the die 33 by the upward movement of the lower plunger 35 as shown in FIG. 12E and taken out as a compression molded product.

Such conventional procedure of compression molding has, however, a drawback that the powder material 42 when being supplied into the annular space between the die 33 and the center pin 34 is likely to produce a bridge, particularly when a thin pellet 40 having a small diameter is formed. Because of the bridges frequently formed, it is difficult to constantly supply a given amount of the powder material 42, thus making the weight of pellet 40 unstable. In order to feed a fixed amount of the powder material 42 into the die 33, it is of course attempted to destroy the bridge by stirring the heap of the powder material 42 on the die 33 with a plurality of feed shoes 43 provided at an angle to the direction of movement of the die 33 and driven by the rotation of the rotary disk 31. This attempt at eliminating the bridge is yet insufficient to fully prevent the variation in weight and height of the pellets 40.

The pellet 40 formed in the compression molding is pressed upward and unloaded from the space defined by the stationary center pin 34 and the die 33 by the ejecting action of the lower plunger 35. Since the pellet 40 is stuck to the center pin 34 and the die 33 at the inner side and outer side thereof respectively by the pressure given during the compression molding, the lower plunger 35 is required to have a considerable amount of strength to unload the pellet 40 by pushing it up. This causes severe abrasion on the sliding surfaces between the lower plunger 35 at its bottom and the surface of the cam 41 which functions to lift up the lower plunger 35 as the rotary disk 31 rotates.

Further, the pellet 40 is forcibly unloaded by the ejecting action of the lower plunger 35 though it is almost fixedly stuck to the inner side of the die 33 and the outer side of the center pin 34. For preventing the pellet 40 from being damaged during the removal from the die 33, the pellet 40 is required to be tapered both on its inner and outer sides at a relatively wide angle. When the pellet 40 of a ring-like shape is tapered both on the inner and outer sides, its overall weight is decreased. This cannot be compensated by setting the height of the pellet 40 vertical to the radial direction to be greater, because the lower part of the pellet 40 becomes too small in thickness due to the tapering.

Since the pellet 40 is small both in height h and weight, three or four pellets 40 are needed for filling a cell case 62 as a positive electrode material to construct an alkaline-manganese dry cell 61 of R20 to R03 types as shown in FIG. 13. As the number of the pellets 40 to be encased increases, more steps are needed for compression molding and filling process, thus declining the efficiency of production and soaring the overall cost. The gaps made between the inner side of the pellet 40 and a separator 64 and between the outer side of the pellet 40 and the cell case 62 obstruct the smooth flow of the electric current. Also shown in FIG. 13 are a label cover 63, a gel negative electrode 65, a collector 66, a resin seal 67, insulators 68, and a bottom cap 69.

In general, the ring-like pellets are made from a mixture material by a compression molding machine as described above and transferred by belt conveyors or parts feeders to the next step of loading with an automatic loader. Those steps are hardly carried out at a higher speed thus being low in productivity. Also, a system including the compression molding machine, the conveyors, and the automatic loader is bulky requiring a large installation area and increasing the facility cost. While the pellets are being transferred by the conveyors, they may suffer from vibrations and shakes resulting in physical damages. If chips peel off from the pellets, they may be scattered around the system thus impairing the environment of a working site.

BRIEF SUMMARY OF THE INVENTION

In view of the foregoing, it is an object of the present invention to provide a method and an apparatus for molding a powder material by compression which is capable of stably forming pellets being constant in weight and height, and of ejecting out a formed pellet from a die with a little amount of force, and has high productivity with less abrasion of components and less possibility of damaging the pellets.

It is also an object of the present invention to provide a dry cell which contains in its case a less number of pellets, of which inner and outer sides are less or not tapered, thus ensuring high capacity and high performance of supplying a higher current and contributing to the improvement of productivity.

It is another object of the present invention to provide a rotary type powder compression molding assembly system being capable of both forming a pellet by compression molding and inserting it into a case thus increasing the productivity, minimizing the space requirement and the cost, and improving the quality of pellets and the performance of a dry cell.

To accomplish the above said object, in a compression molding method for compressing a powder material filled in an annular molding space defined between a cylindrical die and a center pin mounted in the axial center of the die with a lower plunger and an upper plunger to form a ring-like pellet, the present invention is characterized in that the powder mixture is supplied into the die under a state that the center pin is located lower than the top surface of the die, after which the center pin is lifted up to a given molding position to define the annular molding space between the center pin and the die, and the powder mixture in the annular molding space is compressed from upper and lower sides with the upper plunger and the lower plunger.

The powder mixture can be thereby fed into the die without making any bridges. Since the center pin is lifted up to its molding position after the die is filled with the powder mixture, the annular molding space can be filled with a constant amount of the powder mixture, whereby pellets of uniform weight and height can be stably formed.

After the compression molding of the powder mixture, the center pin is unitedly lifted up with the lower plunger so as to push up the formed pellet out of the die, after which the pellet is taken out from the center pin. Accordingly, the pellet with the center pin can easily be pushed out of the die with a small amount of force. The pellet released from a compressing stress of the die is stuck to the center pin with a less force, thus can be readily taken out from the center pin without a wide tapering angle at the side thereof. Further, a given amount of the powder mixture is measured out while the center pin is immersed in the powder mixture, after which the lower plunger is lowered to cause the top surface of the powder mixture to sink lower than the top surface of the die, while the upper plunger is lowered to close an opening of the die with the lower end thereof, and the center pin immersed in the powder mixture is vertically reciprocated while being lifted up to its molding position, where the top end thereof emerges from the top surface of the powder mixture, and where the annular molding space is defined between the center pin and the die.

Since the opening of the die is closed by the upper plunger and the center pin is vertically reciprocated during the upward movement, the powder mixture remaining on the center pin is completely removed. As the annular molding space is filled with the precise amount of the powder mixture, pellets of uniform weight and height can be stably formed. In particular, the center pin may have a sharp tip for ease of the removal of the remaining powder mixture. The powder can be precisely measured out without being disturbed by such configuration of the center pin, as it is immersed in the powder mixture when the measurement is made.

To implement the above described compression molding method, a powder compression molding apparatus of the present invention has a molding unit comprised of a cylindrical die, a center pin disposed at the axial center of the die, and a lower plunger and an upper plunger for compressing a powder mixture filled in an annular molding space defined between the die and the center pin, and is characterized in that the lower plunger and the center pin are arranged to be movable in the axial direction in relation to each other as well as to the die, and that actions of the lower plunger and the center pin are separately controlled by an operation controller.

More specifically, the apparatus further comprises a first lower plunger actuating cam means for driving the lower plunger to perform a compression molding action in the die, a second lower plunger actuating cam means for driving the lower plunger to perform a vertical motion in the die, a third lower plunger actuating cam means for carrying out an ejecting operation to push the pellet upwardly out of the die, and a center pin actuating cam means for driving the center pin to ascend to a molding position after being moved downwardly lower than the top surface of the die, and to perform the ejecting operation to push the pellet out from the die, by which a series of molding actions can be carried out as the molding unit moves.

Further, the apparatus may further comprise a lower lifting shaft, to the upper end of which the lower plunger is mounted and within which the center pin is coaxially disposed for relative sliding movements, the lower lifting shaft being provided with a first cam follower at a lower end thereof to engage with a lower pressure roller and with a second cam follower at a middle part thereof to engage with a lower plunger actuating cam, and a third cam follower connected to the center pin to engage with a center pin actuating cam, whereby the lower pressure roller and the first cam follower constitute a first lower plunger actuating cam means, the lower plunger actuating cam and the second cam follower constitute a second lower plunger actuating cam means, and the center pin actuating cams and the third cam follower constitute a center pin actuating cam means.

By the engagement between the first cam follower at the lower end of the lower lifting shaft and the lower pressure roller, a great amount of load needed for compression molding action can be smoothly transmitted to the lower plunger. Also, the engagement between the cam and the second and third cam followers mounted to a side of the middle part of the lower lifting shaft allows the lower plunger and the center pin to be operated at a high speed.

The center pin actuating cam means may comprise a center pin actuating cam having a cam surface only at a lower side thereof, the cam follower joined to the center pin and engaged with the cam surface of the center pin actuating cam, and a resilient member for constantly urging the center pin upwardly and detachably pressing the cam follower against the cam surface of the center pin actuating cam. The center pin can thereby be downwardly retracted upon receiving the great load of compression molding action by contraction of the resilient member, positively preventing damages or bend of a cam follower shaft of the center pin. The resilient member also ensures the engagement between the cam follower and the center pin actuating cam, assisting the center pin to smoothly perform the necessary actions.

Also, the center pin actuating cam means may be so constructed that the center pin is vertically reciprocated more than once during the step of lifting up the center pin from its lowered position to the molding position. Any residual powder mixture on the center pin can thereby be effectively cleared away as the center pin is lifted up from the powder mixture, so that a precise amount of the powder mixture can remain in the annular molding space.

The center pin may comprise an upper portion for defining the annular molding space with the die and a lower portion which is smaller in diameter than the upper portion, and a powder outlet space may be provided between the lower portion and the lower plunger, so that the powder mixture which entered into the clearance between the lower plunger and the center pin moving in relation to each other can be automatically and quickly discharged, preventing abrasion or increase in frictional resistance between the lower plunger and the center pin. Thus, smooth relative movements of the lower plunger and the center pin can be guaranteed without frequent maintenance operations.

At least the outer side of the center pin or both of the inner side of the die and the outer side of the center pin may be perpendicularly constructed to give the pellet a more cylindrical configuration. Pellets which are great in height and have little differences in thickness between their upper and lower ends can thereby be molded. Also, such pellets can be readily unloaded according to the above described method.

The center pin may have a sharp end of a bullet-nose shape or a polygonal conical shape provided at the top end thereof. This allows the residual powder mixture on the center pin to be effectively removed while the center pin is lifted up to emerge from the powder mixture, thus keeping a precise amount of the powder mixture in the annular molding space.

Further, a plurality of the molding units are mounted at equal intervals on a circle about the center of rotation of a rotary disk, so that pellets can be continuously and time-effectively produced with the rotating movement of the rotary disk with a simple and compact structure.

A dry cell of the present invention contains a powder mixture pellet which is formed to be of a ring-like shape by the above described compression molding method and has an inner side or both inner and outer sides thereof not being tapered thus having a cylindrical configuration. As the differences in thickness of the powder mixture pellet at its upper and lower ends are minimized, a necessary quantity of powder mixture for meeting requirements of the dry cell can be sufficed with a fewer number of pellets. Such dry cell is capable of supplying a greater amount of electric current, as there is no large gaps between the inner side of the pellets and a separator or between the outer sides of the pellets and the case.

A dry cell of any types from R20 to R1 may be constructed to have one or two powder mixture pellets contained in a cell case which are formed by the above described compression molding method, thereby decreasing the number of steps for inserting the pellets into the case to increase productivity and to reduce the overall cost.

In a rotary type powder compression molding assembly system according to the present invention, a plurality of molding units for producing pellets from a powder mixture by compression molding are mounted at equal intervals on a circle about the center of rotation of a rotary disk, and an insertion assembly station is mounted at an appropriate position on a movement path of the molding units for inserting the molded pellet into a case, thereby carrying out compression molding action and insertion assembling action with a single system at a high speed, thus increasing productivity and decreasing space requirement and the facility cost. As there are fewer steps for transferring the pellets, the pellets are less likely to be damaged during the transfer, increasing the quality of product.

A plurality of the insertion assembly stations may be provided so that the pellets formed at each of the molding units located between the insertion assembly stations are inserted into the case immediately after the compression molding at the next insertion assembly stations, thereby it is possible to load the pellets into the cases at two or more different locations, or to load a plurality of pellets into one case in a single assembly system, helping to further increase the speed of operation.

The insertion assembly station may be provided in a pair, and may further comprise a case carrying-in means for feeding the cases into one insertion assembly station, a series of case holding means for holding and conveying the cases loaded with the pellet to another insertion assembly station, and a case carrying-out means for removing the cases after being loaded with the pellet at another insertion assembly station. This allows the case to be filled with two or more pellets in a single assembly system, thus increasing the speed of production.

Each of the case holding means may be mounted on the rotary disk corresponding to each molding unit and be constructed to hold and cause the case loaded with the pellet at the first insertion assembly station to return to its retracted position beside the molding unit, and to advance the case to the movement path of the molding units at the next insertion assembly station. Accordingly, the cases can be readily transferred into the succeeding insertion assembly station.

The molding unit may comprise a substantially cylindrical die, a center pin mounted in the axial center of the die, and a lower plunger and an upper plunger for molding a powder mixture filled in an annular molding space defined between the die and the center pin, so that the pellet is assembled into the case by being pushed up into the case located coaxially above the die by the action of both the lower plunger and the center pin, and lowering the center pin thereafter while the pellet is supported by the lower plunger. This permits the molding unit to be used as an insertion assembling means thus contributing to the simple construction of the system.

The case holding means may be mounted to one end of an operating lever which is mounted on the rotary disk corresponding to each molding unit, the operating lever being rotatably connected to the rotary disk with a cam follower at the other end thereof engaged with a cam disposed coaxially with the rotary disk, the cam having a retraction cam surface for holding the case holding means at its retracted position beside the molding unit and an operating cam surface for causing the case holding means to advance to and retract from the movement path of the molding unit. Accordingly, the case holding means can be controlled by a simple construction of cam arrangements to move between the position on the movement path of the molding units and the retracted position as the rotary disk rotates, allowing the formed pellets to be loaded into the case smoothly and continuously.

These and other objects, features and advantages of the present invention will be apparent from the following description of the preferred embodiments of the invention in conjunction with the accompanying drawings.

BRIEF DESCRIPTION OF THE DRAWINGS

FIG. 4A is a partial longitudinal sectional view of a rotary type powder compression molding apparatus according to another embodiment of the present invention and FIG. 4B is an enlarged view of a primary part of the apparatus shown in FIG. 4A;

FIGS. 5A to 5J are explanatory views showing steps of forming operation in the compression molding apparatus of FIG. 4A;

FIG. 11 is a longitudinal sectional view of a primary part of the conventional rotary powder compression molding machine for forming a ring-like pellet;

DETAILED DESCRIPTION OF PREFERRED EMBODIMENTS

Figure 1:
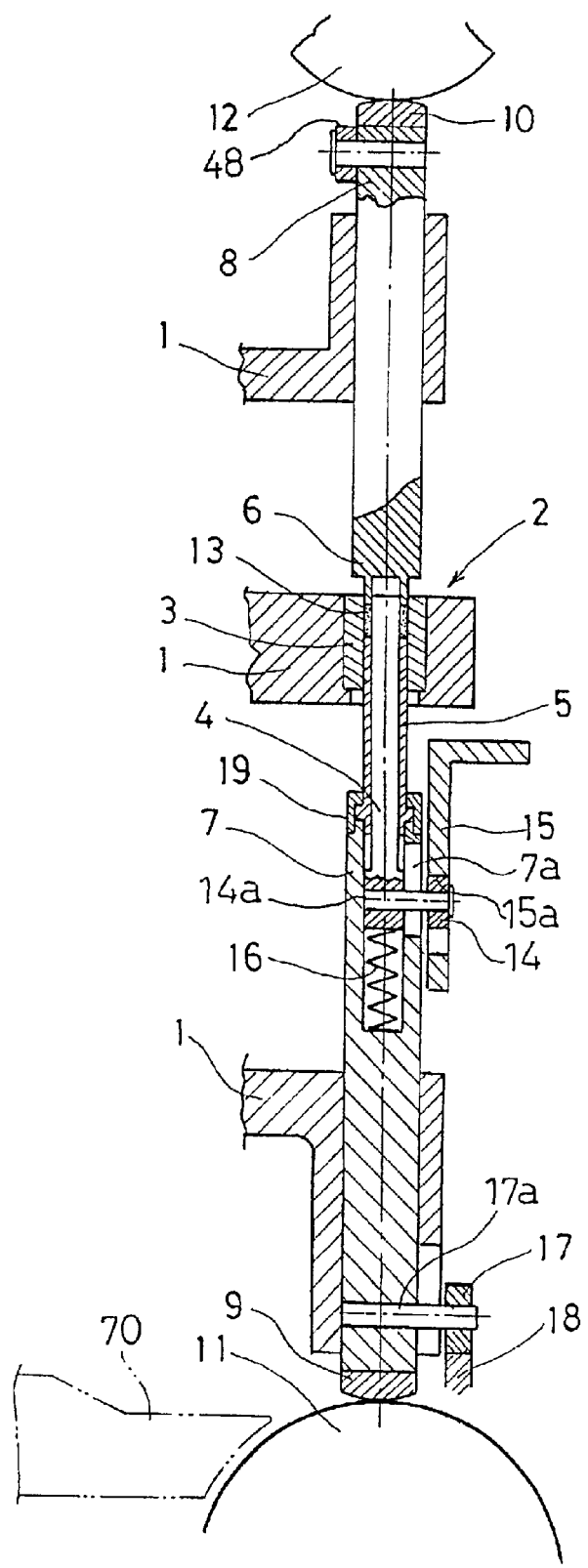
FIG. 1 is a partial longitudinal sectional view of a rotary type powder compression molding apparatus according to one embodiment of the present invention.
Figure 2:
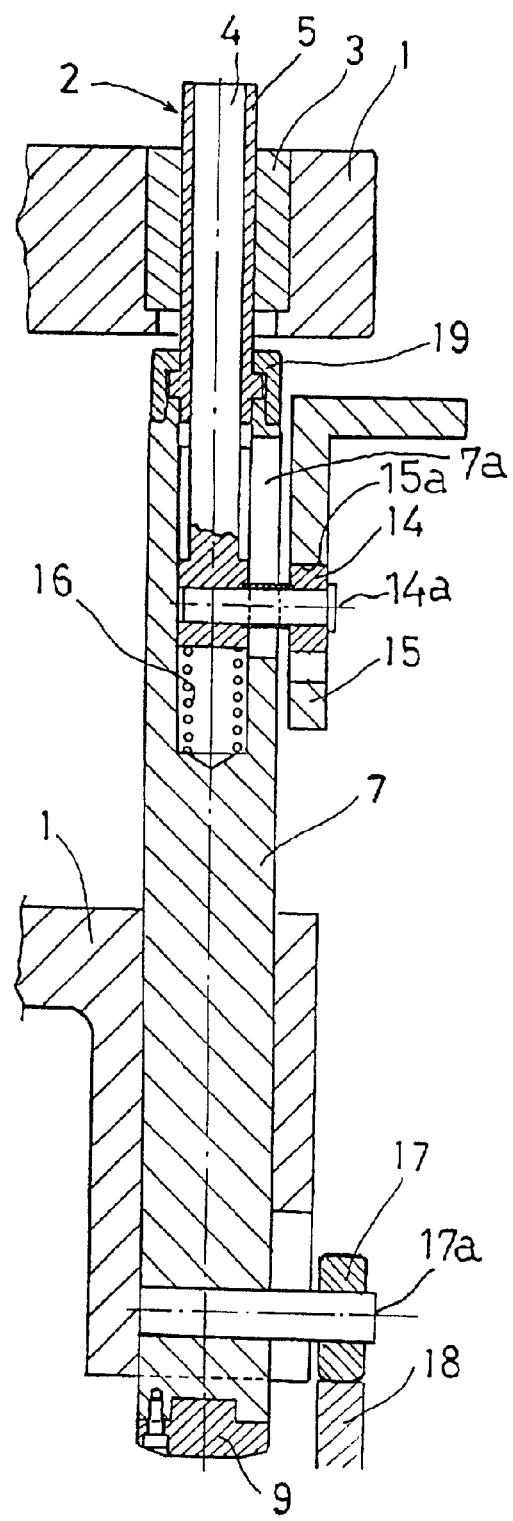
FIG. 2 is a longitudinal sectional view showing a primary part of the compression molding apparatus of FIG. 1.

Preferred embodiments of the present invention will be described referring to the accompanying drawings. FIG. 1 is a partial longitudinal sectional view of a rotary type powder compression molding apparatus according to one embodiment of the present invention, and FIG. 2 is a longitudinal sectional view showing a primary part of the apparatus. As shown, a rotary disk 1 has a plurality of molding units 2 arranged thereon at equal intervals in a concentric circle about the center of rotation. Each molding unit 2 comprises a die 3 of a substantially cylindrical shape, a center pin 4 located in the center of the die 3, and a pair of lower and upper plungers 5,6 for inserting from below and above respectively into an annular space defined between the die 3 and the center pin 4.

The die 3 is fixedly mounted to the rotary disk 1 and the center pin 4 is arranged for relative sliding movements in and along a center bore of the lower plunger 5. The lower plunger 5 and the upper plunger 6 are joined to the upper end of a lower lifting shaft 7 and the lower end of an upper lifting shaft 8, respectively, both being mounted to the rotary disk 1 for upward and downward movements. End members 9,10 serving as cam followers are detachably mounted to the lower end of the lower lifting shaft 7 and the upper end of the upper lifting shaft 8, respectively. The end members 9 and 10 are engaged with a lower and an upper pressure rollers 11,12 which are mounted at given locations for acting as cam means when the rotary disk 1 rotates. More specifically, the end member 9 and the lower pressure roller 11 constitute a first lower plunger actuating cam means for driving the lower plunger 5 to carry out a molding action in the die 3. When the lower and the upper plungers 5,6 are moved upward and downward by the corresponding actions of the lower and the upper lifting shafts 7,8, they compress a powder mixture filled in the annular space between the die 3 and the center pin 4 to form a ring-like pellet 13.

A cam follower 14 is detachably mounted to the center pin 4 at the lower end thereof by a cam follower pin 14a which extends through a guide hole 7a provided in the lower lifting shaft 7. The cam follower 14 is engaged with a center pin actuating cam 15 with a cam slot 15a, both constituting a center pin actuating cam means. The cam 15 has such a shape that the center pin 4 is lowered from the molding position when the powder mixture is supplied into the die 3, returned upward to the molding position for compression molding, and lifted further together with the pellet 13 stuck thereto as the lower plunger 5 moves upward to project from the die 3 before lowered back to the molding position. The center pin 4 remains urged upwardly by the yielding force of a spring 16 mounted between the lower end of the center pin 4 and the lower lifting shaft 7.

A cam follower 17 is detachably mounted by a cam follower pin 17a to a side at the lower end of the lower lifting shaft 7. The cam follower 17 is engaged with a lower plunger actuating cam 18 hence constituting a second lower plunger actuating cam means. The cam 18 is so shaped that the lower plunger 5 is lowered from a given molding position in the annular space in the die 3 when the powder mixture is supplied into the die 3, returned upward to the molding position for carrying out the compression molding of the powder mixture filled in the annular space between the die 3 and the center pin 4 together with the upper plunger 6, and lifted further for unloading the molded pellet 13 from the die 3. The upward ejecting operation of the pellet 13 from the die 3 is performed by the action of a third lower plunger actuating cam means comprised of another cam 70 shown by the two-dot chain line in FIG. 1 being engaged with the end member 9. The lower plunger 5 is detachably tightened by a box nut 19 to the upper end of the lower lifting shaft 7.

Figures 3A, 3B, 3C:
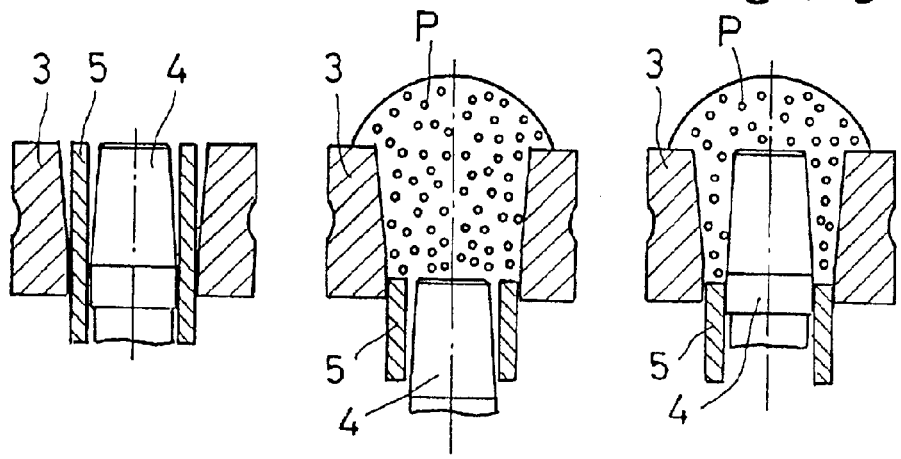
FIGS. 3A to 3F are explanatory views showing steps of forming operation in the compression molding apparatus of FIG. 1.
Figures 3D, 3E, 3F:
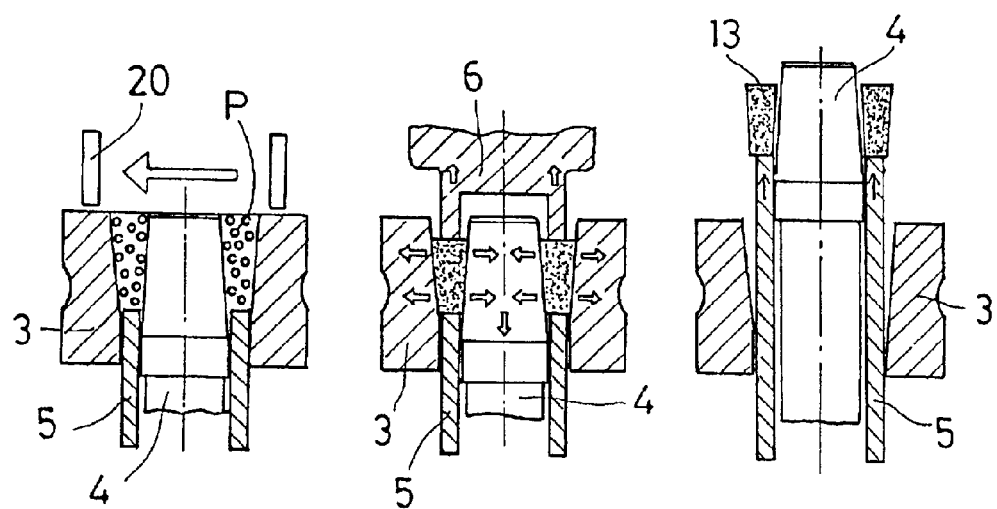

A process of forming the pellet 13 with the rotary type powder compression molding apparatus is now explained referring to FIGS. 3A–3F. The process starts with lowering the lower plunger 5 and the center pin 4 from their initial positions shown in FIG. 3A after a previously molded pellet 13 has been taken out to an identical position shown in FIG. 3B for filling the die 3 with a powder mixture P. Since the center pin 4 stays at the lowermost position, the powder mixture P filled in the die 3 is prevented from creating any bridge. Then, the center pin 4 is lifted upward to a position where its top surface is flush with the top surface of the die 3 as shown in FIG. 3C. After the lower plunger 5 is lifted upward to the bottom position to determine the annular space of a desired pellet size, an extra of the powder mixture P is removed by running a feed shoe 20 on the top surfaces of the die 3 and the center pin 4 as shown in FIG. 3D. Accordingly, a predetermined amount of the powder mixture P for forming the pellet 13 is measured out.

This is followed by the step of compressing the predetermined amount of the powder mixture P with the upper plunger 6 and the lower plunger 5 from upper and lower sides to form the pellet 13 as shown in FIG. 3E. The upper plunger 6 is then retracted upwardly, while the lower plunger 5 is lifted upward together with the center pin 4 for pushing the pellet 13 out from the die 3 by the lower plunger 5 as shown in FIG. 3F. Finally, the center pin 4 is lowered to be extracted from the pellet 13 and the pellet 13 left on the lower plunger 5 is taken out.

As described above, the center pin 4 and the lower plunger 5 are first lowered to their common lowermost positions which are lower than the predetermined position of the annular molding space in the die 3 before supplying the powder mixture P into the annular space between the die 3 and the center pin 4 thereby preventing formation of bridges. After an abundance of powder mixture P is fed into the die 3, the center pin 4 and the lower plunger 5 are upwardly returned to their respective molding positions, and after an excess of the powder mixture P on the top surface of the die 3 is removed with the action of the feed shoe 20, the compression molding action is carried out. It is thereby possible to stably fill the annular space in the die 3 with a constant amount of the powder mixture P without creating any bridges even for forming a thin pellet 13 being 0.98 mm in thickness. The finished pellet 13 is thus uniform in both weight and height.

Also, when taking out the molded pellet 13 from the die 3 and the center pin 4 by ejecting out the pellet with the lower plunger 5, the center pin 4, to which the pellet 13 is still stuck, is also lifted upward together with the lower plunger 5 until the pellet 13 is out of the die 3 and then lowered back to be extracted from the pellet 13 so that the pellet 13 stays on the lower plunger 5. This permits a load exerted to the lower plunger 5 in ejecting out the pellet 13 to be remarkably decreased as compared with the conventional compression molding machine.

The ejecting action to take out the pellet 13 from the die 3 with the lower plunger 5 is carried out by the cam 70 denoted by the two-dot chain line in FIG. 1 and the end member of the lower lifting shaft 7 engaged therewith.

In this embodiment, it is not necessary to separate the pellet 13 from the center pin 4 which are stuck to each other when the pellet 13 is pushed out from the die 3, but it is only necessary to apply a force to the lower plunger 5 required for detaching the pellet 13 from the inner side of the die 3. The force required for unloading the pellet 13 is thus reduced to 20% to 50% as compared with the prior art arrangement. For separating the pellet 13 from the center pin 4, the center pin 4 can be readily extracted from the pellet 13. More specifically, the pellet 13 released from the containment in the die 3 is restored to a size which is 0.1 to 0.2 mm greater in both outer and inner diameters than it has been in the die 3. This allows the center pin 4 to be easily withdrawn from the pellet 13 without requiring extra force.

Accordingly, the pellet 13 molded with the molding apparatus of the embodiment has the following advantages. It is possible that the inner side of the ring-like pellet 13 is not tapered but is shaped straight having a cylindrical inner space. The outer side may be tapered only at a smaller angle. In case the pellet 13 is small in height, the both sides may be shaped perpendicularly. Even when the pellet 13 is greater in height, a difference in diameter between the top and the bottom of the pellet 13 is minimized. On the other hand, the pellet molded by the conventional machine is lifted upward by the lower plunger when it remains stuck between the die and the fixed center pin. Hence, the lifting action requires the lower plunger to generate a greater amount of force. For minimizing the required force, the both sides of the pellet had to be tapered at considerable angles.

In the compression molding apparatus of the embodiment, the lower plunger 5 is detachably joined by the box nut 19 to the lower lifting shaft 7 while the end member 9 and the cam follower 17 are also mounted detachably. The center pin 4 is extended through the lower plunger 5 and the lower lifting shaft 7, to which the cam follower 14 is detachably mounted. Accordingly, when any of the components is worn or damaged, it can simply be replaced with a new one thus facilitating the maintenance.

In each of the molding units 2 arranged at equal intervals on the concentric circle about the center of rotation of the rotary disk 1, the center pin actuating cam 15 cooperating with the center pin actuating cam follower 14 and the lower plunger actuating cam 18 cooperating with the lower plunger actuating cam follower 17 mounted to the lower lifting shaft 7 are mounted to the stationary frame (not shown) of the compression molding apparatus. This allows the lower plunger 5 and the center pin 4 to perform the series of actions described above as the rotary disk 1 rotates.

FIG. 4A is a partial longitudinal sectional view of a rotary type powder compression molding apparatus according to another embodiment of the present invention and FIG. 4B is an enlarged view showing a primary part of FIG. 4A, in which parts identical or similar to those previously described with reference to FIGS. 1 and 2 are denoted by the same reference numerals, of which description will be omitted, and only the differences will be explained.

In the rotary type powder compression molding apparatus of this embodiment, a center pin 44 has a tip end 44a of a bullet-nose shape provided on the uppermost end thereof which is arcuate at tip and parabolic at side. A lower part 44b of the center pin 44 is slightly reduced in diameter so that an annular space or powder outlet passage 45 is provided between the lower plunger 5 and the lower part 44b of the center pin 44. The lower lifting shaft 7 also has a powder outlet aperture (not shown) provided therein for allowing the powder mixture P running from the powder outlet passage 45 to be discharged to the outside. The tip end 44a is designed for smoothly clearing the powder mixture P which comes to contact with the center pin 44 and not limited to its bullet-nose shape but may have a conical or pointed polygonal shape which is substantially acute at the tip and has smooth circumferential sides.

The action of a center pin actuating cam 46 is controlled by the cam follower 14 of the center pin 44 engaging with a cam surface 46a at its upper side. For that purpose, the cam follower 14 remains urged upward against the cam surface 46a of the center pin actuating cam 46 by the yielding force of a compression spring 47 mounted between the lower end of the center pin 44 and the lower lifting shaft 7. The center pin actuating cam 46 actuates the center pin 44 in a manner described later with reference to the procedure of forming the pellet 13.

The upper lifting shaft 8 is provided with an upper plunger cam follower 48 at a side thereof. As the rotary disk 1 rotates, the cam follower 48 engages with an upper plunger actuating cam (not shown) mounted to a frame (not shown) and drives the upper lifting shaft 8 to lower the upper plunger 6 prior to the compression molding action. This action will be explained later. The upper plunger 6 is driven upward and downward with the upper lifting shaft 8 by the engagement between the end member 10 and the upper pressure roller 12 similarly with the previously described embodiment shown in FIGS. 1 and 2.

Other components are similar to those of the previous embodiment shown in FIGS. 1 and 2, except that the operation control of the center pin 44, the upper plunger 6, and the lower plunger 5 during the compression molding of the pellet 13 in the molding unit 2 is slightly different. The difference will also be explained later with reference to the procedure of forming the pellet 13.

The procedure of forming the pellet 13 with the rotary type powder compression molding apparatus of this embodiment is now described referring to FIGS. 5A–5J. FIG. 5A illustrates the apparatus under its initial state after the previously molded pellet 13 is unloaded. The lower plunger 5 and the center pin 44 are uniformly descended to a predetermined position in relation to the die 3, and the powder mixture P is heaped in and around the mouth of the die 3 with the use of the feed shoe 20 and the rotating movement of the rotary disk 1 as shown in FIG. 5B. The powder mixture P is thus fed into the die 3 without making any bridges by temporarily lowering the center pin 44 together with the lower plunger 5 in this embodiment. As the rotary disk 1 rotates, the feed shoe 20 is slid on the top of the die 3 to remove an extra of the powder mixture P so that a precise amount of the same required for forming the pellet 13 remains in the die 3 as shown in FIG. 5C. The powder mixture P is measured out by the feed shoe 20 while the center pin 44 is located lower than its molding position, in order that the center pin 44 with the sharp tip end 44a does not obstruct the movement of the feed shoe 20 running on the top surface of the die 3. The lower plunger 5 is located below the center pin 44 by a given distance as shown in FIGS. 5B and 5C. The vertical distance between the lower plunger 5 and the center pin 44 is predetermined corresponding to a precise amount of the powder mixture P required for forming one pellet 13 and controlled by cam setting of the lower plunger actuating cam 18 and the center pin actuating cam 46.

After the precise amount of the powder mixture P is measured out, only the lower plunger 5 is further lowered to cause the surface of the powder mixture P to sink into the die 3 as shown in FIG. 5D. Before the center pin 44 is lifted upward so that its tip end 44a comes out from the powder mixture P, the upper plunger 6 is lowered to close the opening of the die 3 with its bottom as shown in FIG. 5E. This lowering action of the upper plunger 6 is controlled by the upper plunger cam follower 48 engaging with the upper plunger actuating cam.

This is followed by the step of lifting the center pin 44 to its molding position as shown in FIG. 5F by the action of the cam follower 14 engaging with the cam surface 46a of the center pin actuating cam 46. During this step, the center pin 44 is controlled to vertically reciprocate as denoted by the arrow two or three times before its tip end 44a projects out from the surface of the power mixture P in the die 3 as shown in FIG. 5F. This action causes the residual powder mixture P on the tip end 44a of the center pin 44 to be cleared away. The reciprocating action of the center pin 44 is carried out in a manner that the center pin 44 is given moderate shocks which generate vibration thereto. The center pin 44 is then lifted and positioned for compression molding as shown in FIG. 5G. As the residual powder mixture P has completely been removed from the tip end 44a of the center pin 44 with the upper plunger 6 closing the opening of the die 3, the annular space between the die 3 and the center pin 44 is filled with the precise amount of the powder mixture P.

Then, the given amount of the powder mixture P held in the annular space in the die 3 is compressed from above and below by the upper plunger 6 and the lower plunger 5 as shown in FIG. 5H, forming the pellet 13. After that, the upper plunger 6 is upwardly retracted and the lower plunger 5 and the center pin 44 are unitedly lifted upward to push up the pellet 13 out of the die 3 as shown in FIG. 5I. Finally, as shown in FIG. 5J, the center pin 44 is downwardly drawn out from the pellet 13 to cause the pellet to sit on the lower plunger 5, which is then taken out therefrom.

In this embodiment of the present invention, similarly with the previously described embodiment, the annular space in the die 3 is filled with the powder mixture P without developing any bridges. Even when a thin pellet 13 is to be formed, a precise amount of the powder mixture P can always be fed into the annular space in the die 3. Also, the load exerted to the lower plunger 5 during the removal of the pellet 13 can considerably be decreased as compared with the conventional compression molding machine. As the pellet 13 is of a cylindrical shape without being tapered on its outer and inner sides, the pellet 13 can be easily taken out. In addition to the above advantages, the following advantages are provided.

In the molding action described above, when the powder mixture P has been measured out and sunk from the top surface of the die 3, the opening of the die 3 is closed with the upper plunger 6 before the center pin 44 is lifted to its molding position. Then, the center pin 44 is, while being lifted upward, vertically shaken to clear the remaining of the powder mixture P away from the tip end 44a thereof. This prevents escape of the powder mixture P from the die 3 during the lifting movement of the center pin 44, hence filling the annular space between the die 3 and the center pin 44 with the precise amount of the powder mixture P and constantly producing the pellet 13 of a desired size and a correct weight. Particularly, the compression molding procedure of the second embodiment is suitable for forming a thinner pellet 13 which has a thickness of about 1 mm.

Since a very small clearance between the lower plunger 5 and the center pin 44 is necessary for relative movements in relation to each other, fine particles of the powder mixture P cannot be prevented from entering into the clearance during the molding action. Such particles cause abrasion of the interface between the lower plunger 5 and the center pin 44 slid with each other or increase the frictional resistance therebetween, adversely affecting the smooth sliding movement of the center pin 44. In order to prevent this, maintenance operation is frequently needed to remove the particles of the powder mixture P from the clearance.

To solve this problem, the compression molding apparatus of the second embodiment has the center pin 44 provided with the lower part 44b having a smaller diameter which does not affect the molding action. There is thus provided a relatively large powder outlet space 45 of an annular shape between the lower part 44b and the lower plunger 5. The particles which entered into the clearance between the lower plunger 5 and the center pin 44 are automatically discharged through the powder outlet space 45 from an outlet aperture (not shown) to the outside.

The construction of such center pin 44 having a lower part with a smaller diameter may cause a decline in physical strength of the center pin 44. The center pin 44 in this embodiment is thus so constructed that it receives substantially no pressing stress in the axial direction during the compression molding action.

More specifically, the center pin actuating cam 46 is provided with its cam surface 46a at upper side for directly accepting the cam follower 14 of the center pin 44 and spaced at lower side by a small distance from the cam follower 14. The cam follower 14 remains upwardly urged towards the cam surface 46a of the center pin actuating cam 46 by the yielding force of a compression spring 47 disposed between the lower end of the center pin 44 and the lower lifting shaft 7. As the center pin 44 has a freedom of movement along vertical directions, it can be retracted downwardly against the force of the compression spring 47 on receiving a downward stress in the axial direction from the compression load generated in the compression molding. In other words, the downward stress exerted to the center pin 44 is absorbed by the contracting action of the spring 47 and will not directly act on the center pin 44. This allows the lower part 44b of the center pin 44 to remain intact, as well as prevents any damage or bend of the cam follower shaft 14a.

In any of the apparatuses of the above described embodiments, the pellet 13 having a perpendicular inner surface and an outer surface tapered at a very small angle. Accordingly, even if the pellet 13 is increased in height which is at right angles to the radial direction, there are almost no differences in diameter between the top and the bottom. As compared with the conventional molding machine which is incapable of producing pellets of great height because of the necessity to construct the pellets tapered at greater angles, the compression molding apparatus of the present invention is capable of manufacturing pellets of a greater height and of a substantially cylindrical shape. Also, since it is only necessary to apply a small amount of force to the lower shaft 5 to separate the pellet 13 stuck to the inner side of the die 3, a pellet 13 of a greater height can easily be taken out from the die 3.

Figure 6:
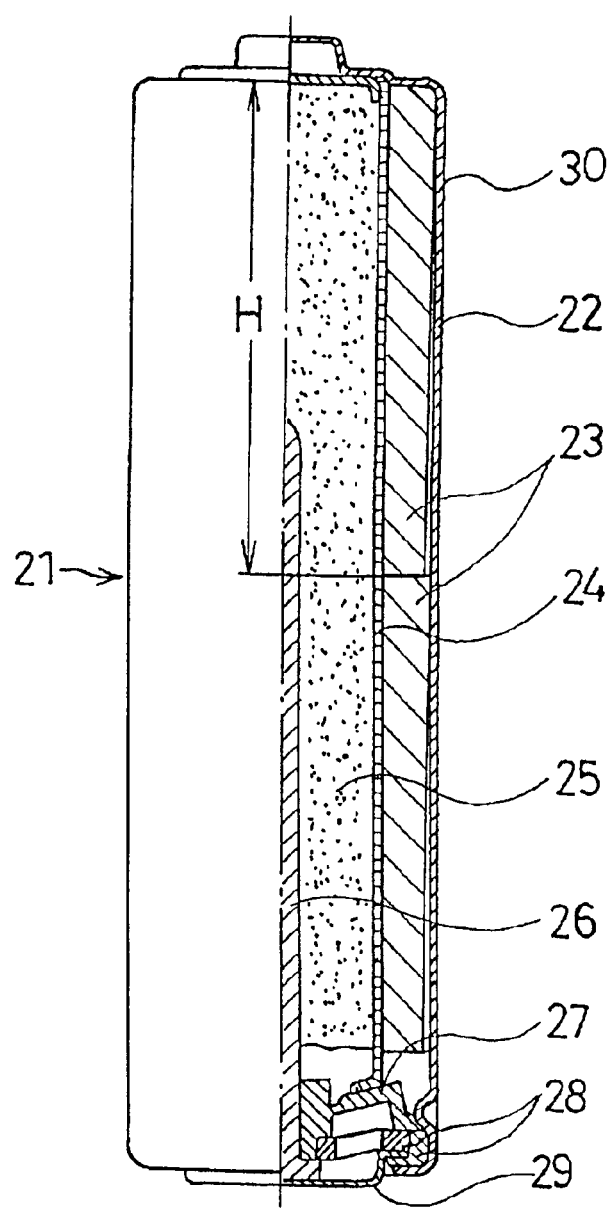
FIG. 6 is a half cross sectional front view of an alkaline manganese dry cell which contains cathode mixture pellets formed by the rotary powder compression molding apparatus of the present invention.
Figure 10:
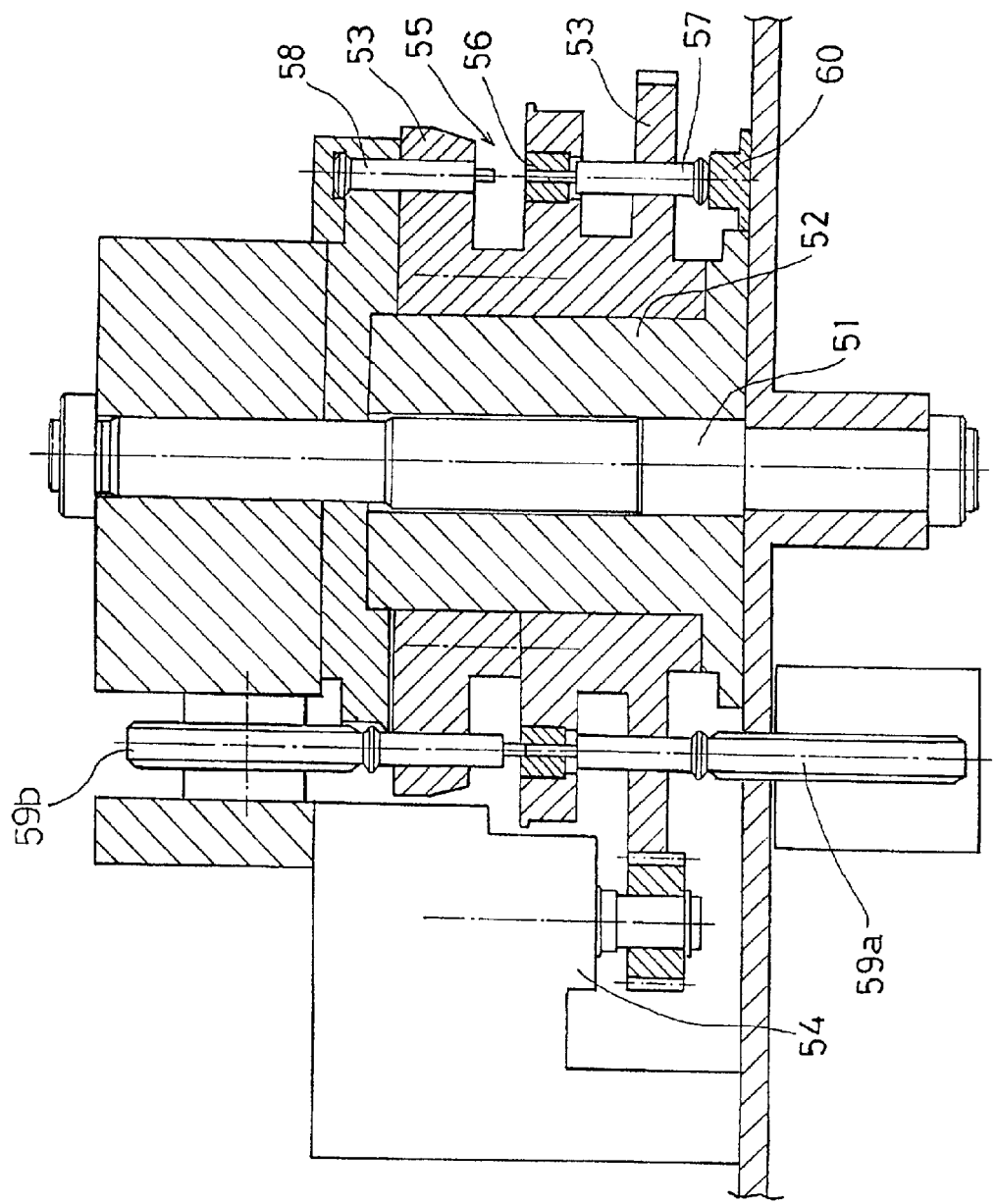
FIG. 10 is a longitudinal sectional view showing a schematic arrangement of a conventional rotary powder compression molding machine.
Figures 12A, 12B, 12C:
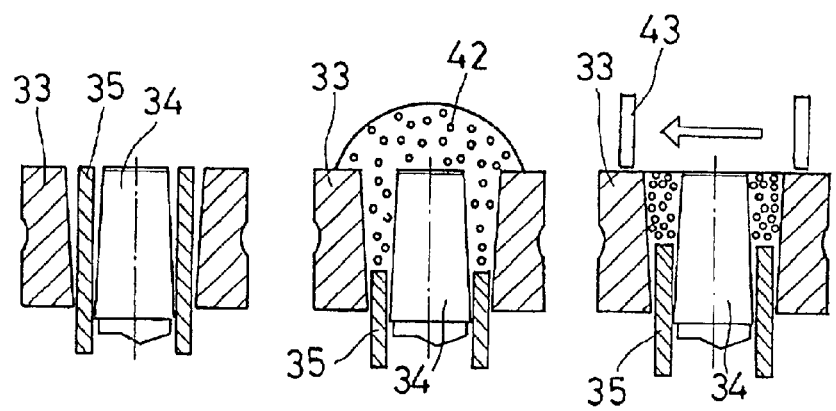
FIGS. 12A to 12E are explanatory views showing steps of forming operation in the conventional machine of FIG. 10.
Figures 12D, 12E:
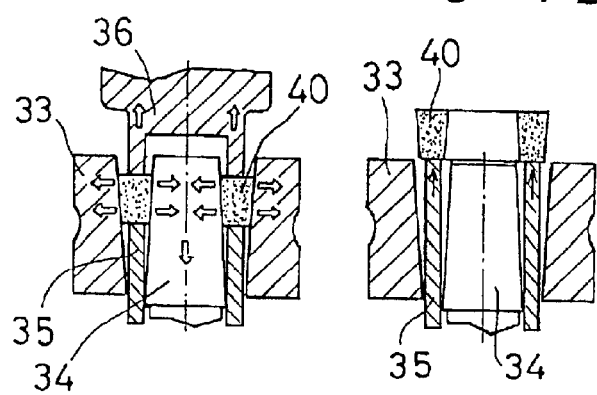
Figure 13:
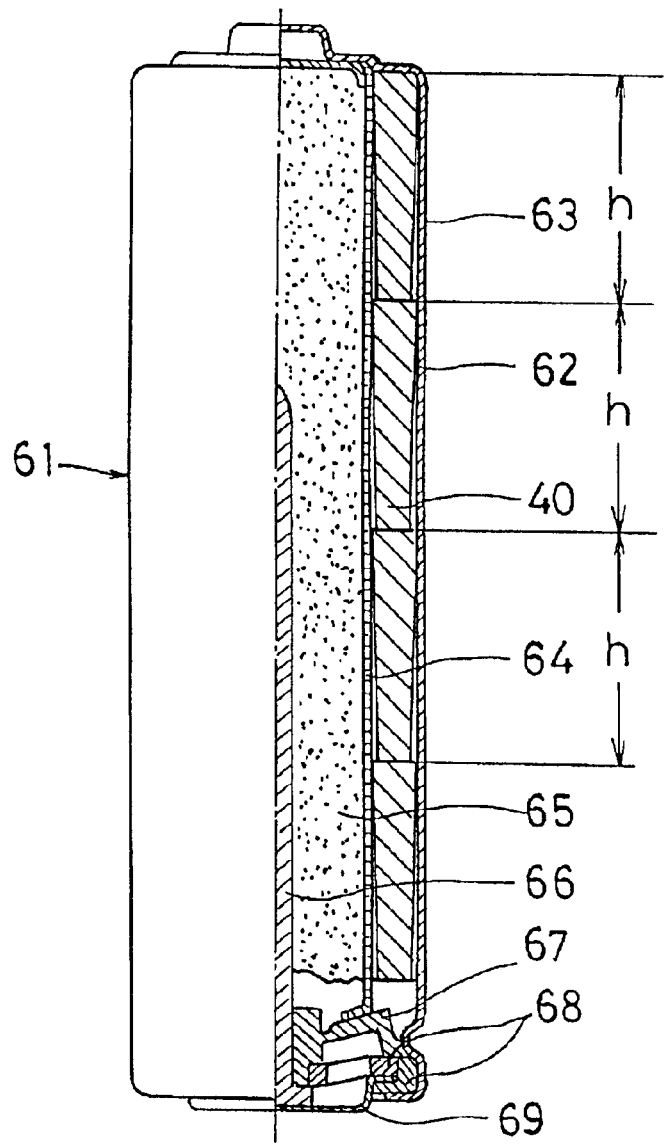
FIG. 13 is a half cross sectional front view of an alkaline manganese dry cell which contains cathode mixture pellets formed by the conventional machine.

Accordingly, a cathode powder mixture pellet of a greater height and being virtually cylindrical can be produced from a powdery material of cathode mixture, which is most suitable for a dry cell. As compared with a conventional dry cell of type R20 to R1 which is composed of three or four cathode pellets 23 as shown in FIG. 10, the cathode mixture pellet 23 produced by the method and apparatus of the present invention has a greater height H, thus constituting an alkaline-manganese dry cell 21 of a standard size with only two of them as shown in FIG. 6. This reduces the number of steps for producing the alkaline-manganese dry cells thus increasing the productivity and declining the cost of production. Also shown in FIG. 6 are a cell case 22, a separator 24, a gel negative electrode 25, a collector 26, a resin seal 27, insulators 28, a bottom cap 29, and a label cover 30.

The alkaline-manganese dry cell 21 contains the cathode mixture pellets 23 of which sides are substantially perpendicular or only slightly tapered. As the quantity of the cathode mixture is increased in the cell case 22, the overall performance of the dry cell is enhanced. Also, the clearances between the inner side of the cathode mixture pellet 23 and the separator 24 and between the outer side of the same and the cell case 22 are minimized hence allowing the supply of a higher current.

A rotary type powder compression molding assembly system according to a further embodiment of the present invention will be described referring to FIGS. 3 and 7 to 9.

Figure 7:
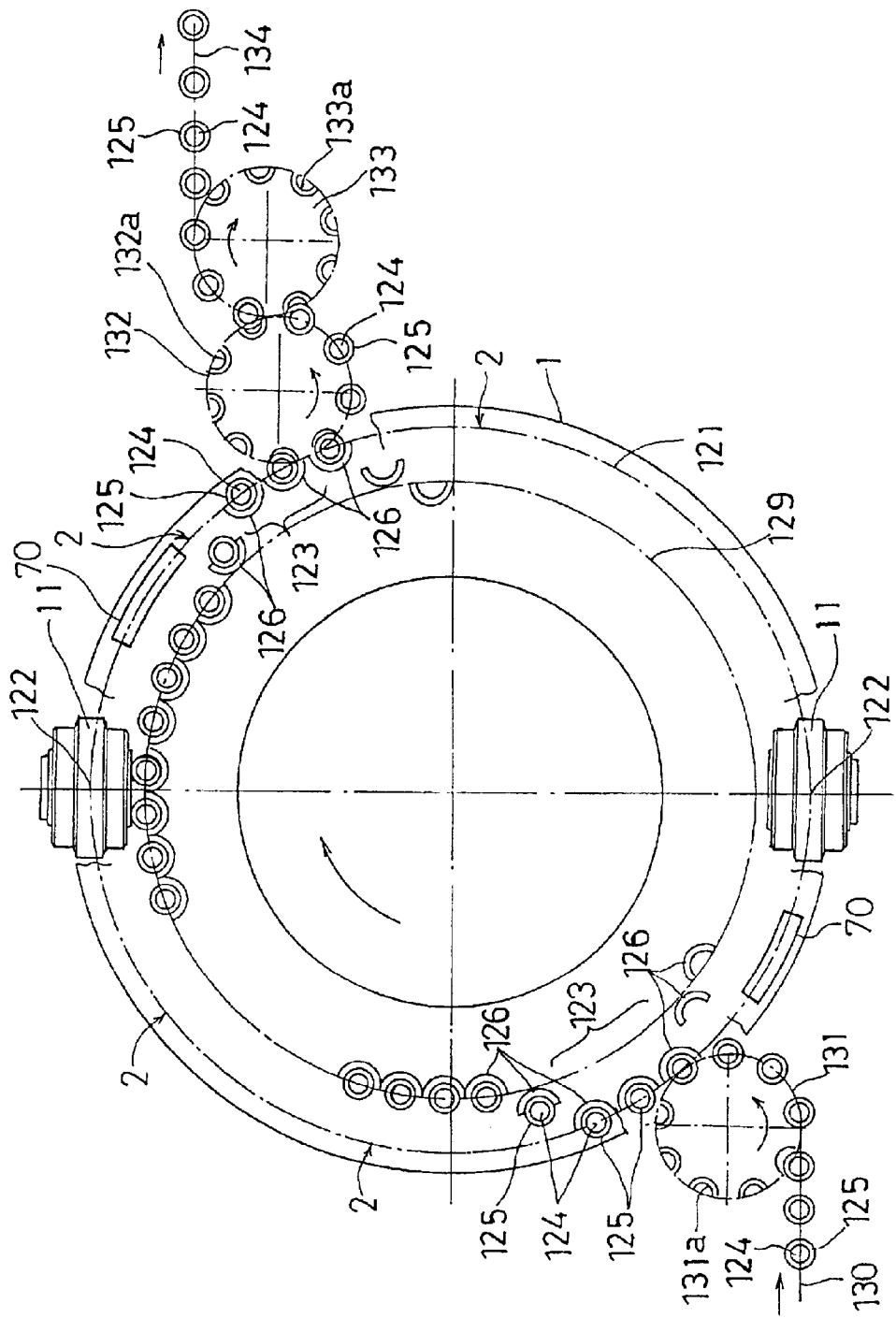
FIG. 7 is a schematic plan view of an entire rotary type powder compression molding assembly system according to one embodiment of the present invention.
Figure 8:
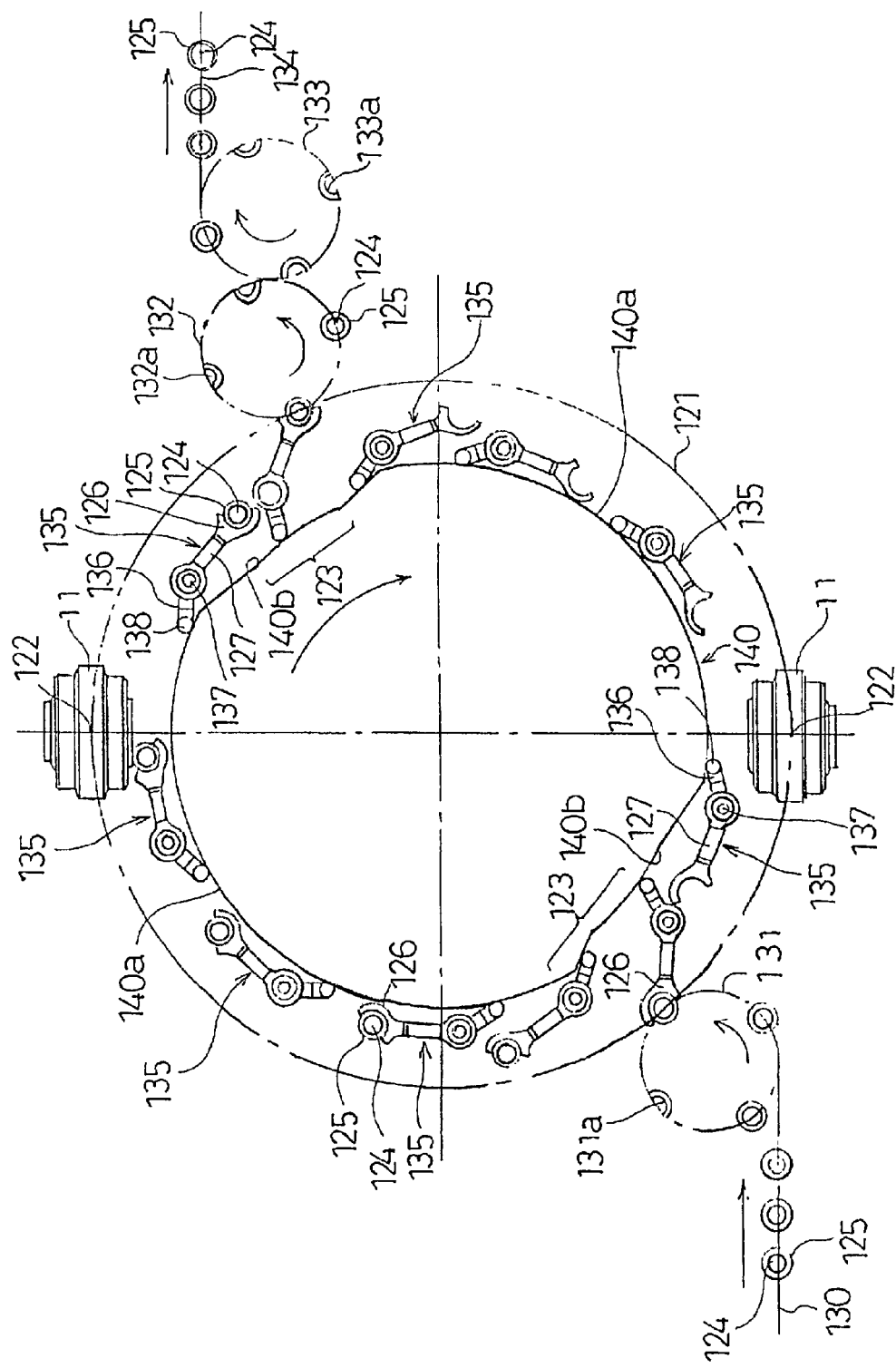
FIG. 8 is a schematic plan view showing the action of an operating lever of the rotary type powder compression molding assembly system of FIG. 7.

As shown in FIGS. 7 and 8, a plurality of molding units 2 are mounted at equal intervals on a concentric circle about the center of rotation of a rotary disk 1. The circle or movement path of the molding units 2 with the rotation of the rotary disk 1 is denoted by the reference numeral 121 in FIG. 7. The molding unit 2 is identical to the one shown in FIGS. 1 and 2 and will be explained in no more detail.

The procedure of forming the pellet is the same as previously described with reference to FIG. 3. The procedure may be also carried out as described referring to FIG. 5.

As best shown in the schematic plan view of the rotary type powder compression molding assembly system of FIG. 7, a couple of compression molding stations 122, each having a lower pressure roller 11 and an upper pressure roller 12, are disposed on the movement path 121 of the molding units 2 on the rotary disk 1 opposite to each other in the diametral direction. Also, an insertion assembly station 123 is disposed on the downstream side of each of the compression molding stations 122 along the movement path on the rotary disk 1.

Figure 9:
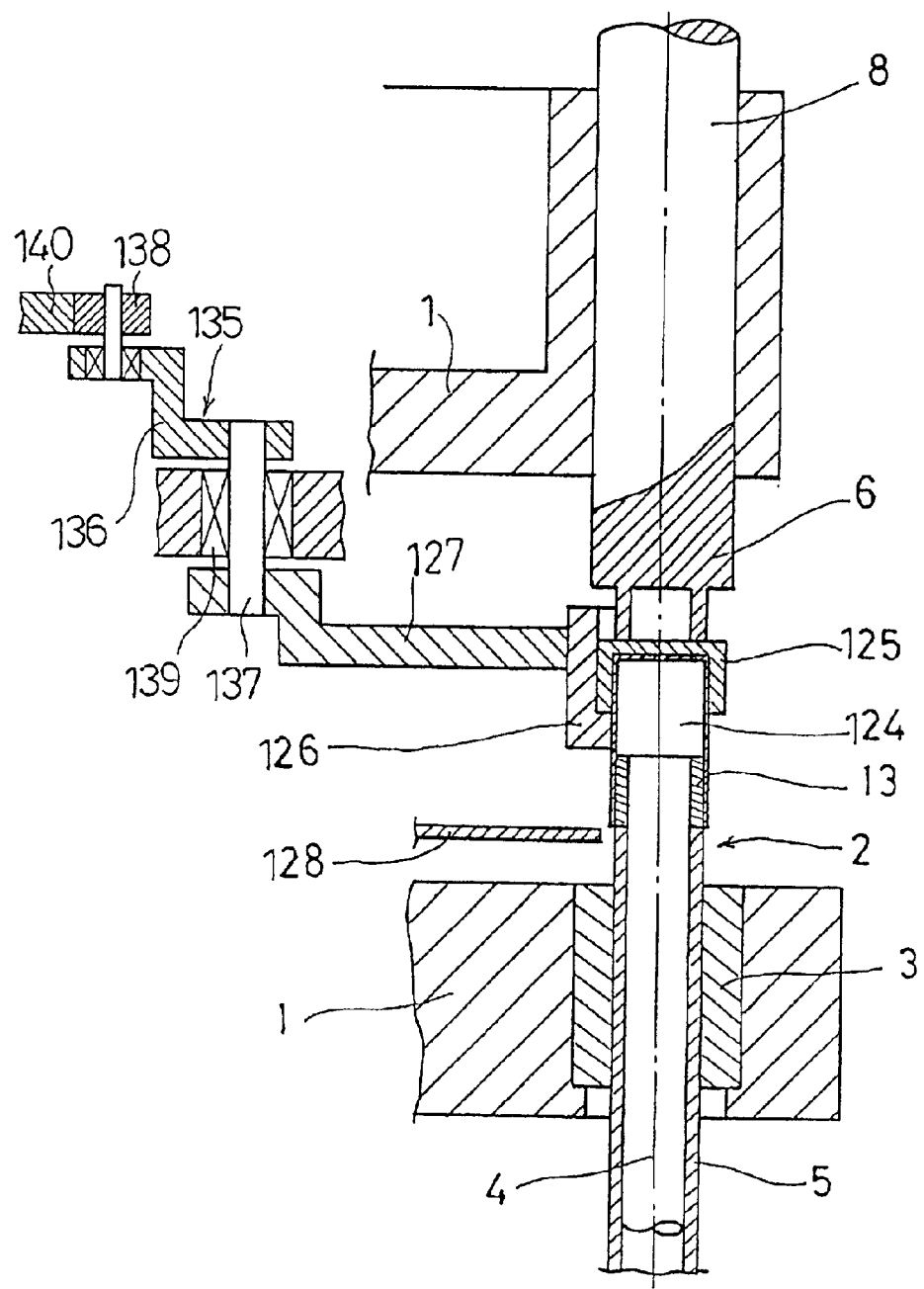
FIG. 9 is a partial longitudinal sectional view of a molding unit and a case holding means in an insertion assembly station of the rotary type powder compression molding assembly system of FIG. 7.

After the pellet 13 is formed in the compression molding station 122, a case 124 to be filled with the pellets 13 is brought in with its opening facing down and held vertically just above the die 3 while the upper plunger 6 is upwardly retracted as shown in FIG. 9. The case 124 is carried at its bottom with a conveyor member 125 which is held by a case holding means 126 mounted on the rotary disk 1 corresponding to each molding unit 2. A magnet (not shown) for magnetically holding the case 124 is embedded in the case holding means 126 while a steel ring is embedded in the conveyor member 125 for being magnetically attracted together with the case 124 by the case holding means 126.

Referring to FIG. 7, the conveyor member 125 holding the case 124 with its opening down is carried on a case carrying-in conveyor 130 and received by a semicircular groove 131a of a case carrying-in disk 131. The conveyor member 125 is then transferred from the case carrying-in disk 131 to the case holding means 126 on the rotary disk 1 at the entrance of the insertion assembly station 123 (at the left hand side in FIG. 7). The case holding means 126 is formed to be half-cylindrical for magnetically holding a semicircular outer surface of the conveyor member 125 and driven by an operating lever 135 described later with reference to FIG. 8, for advancing and retracting movements in the radial direction of the rotary disk 1. The case holding means 126 comes just above the die 3 in the molding unit 2 only when reaching each of the insertion assembly stations 123 and otherwise remains at its radially retracted position where it does not disturb the action of the molding unit 2. In this embodiment, the case 124 is filled with two of the pellets 13 formed by the compression molding action in the two compression molding stations 122 respectively. Denoted by the reference numeral 129 in FIG. 7 is a movement path of the case holding means 126 at its retracted position. As shown in FIG. 9, when the case holding means 126 is withdrawn from the insertion assembly station 123 to its retracted position, the pellet 13 loaded in the case 124 is supported by a support plate 128.

The case 124 when loaded with the second pellet 13 at the exit of the insertion assembly station 123 (at the right hand side in FIG. 7) is received by a semicircular groove 132a of a first case carrying-out disk 132 while being held by the conveyor member 125. The case 124 is further transferred from a semicircular groove 133a of a second case removing disk 133 to a case carrying-out conveyor 134 for being moved on to the next step.

FIG. 8 is a schematic plan view showing the action of the case 124 and the operating lever 135 for holding and conveying the conveyor member 125 which carries the case 124. As shown in FIGS. 8 and 9, the operating lever 135 mounted to each of the molding units 2 comprises a support arm 127, to which the case holding means 126 is joined at the distal end thereof, and an actuating arm 136 having a cam follower 138 consisting of a roller and being mounted to the distal end thereof for rotating action, both being fixedly mounted to either end of a support shaft 137 respectively so as to project toward both sides at predetermined angles from the support shaft 137. The support shaft 137 of the operating lever 135 is rotatably mounted by a bearing 139 to the rotary disk 1. The cam follower 138 remains urged against a cam 140 by the force of a spring (not shown). The cam 140 is coaxially anchored to the rotary disk 1 and has an arcuate retracting cam surface 140a for holding the case holding means 126 at its retracted position on the movement path 129 shown in FIG. 7, and an operating cam surface 140b provided at each of the insertion assembly stations 123 for causing the case holding means 126 to advance to and retract from the position just above the die 3 from its retracted position.

The procedure of forming the pellet 13 and loading the same into the case 124 will be described referring to FIGS. 3, 7, and 9. After the preceding pellet 13 is removed as shown in FIG. 3A, the lower plunger 5 and the center pin 4 are lowered to fill the die 3 with a sufficient amount of powder mixture P without developing bridges as shown in FIG. 3B. Then, the center pin 4 is lifted upward to the molding position as shown in FIG. 3C. The lower plunger 5 is lifted upward and the powder mixture P is measured out to a precise amount with the feed shoe 20 as shown in FIG. 3D. The powder mixture P is then compressed from upper and lower sides by the upper plunger 6 and the lower plunger 5 to form the pellet 13. At this time, the molding unit 2 is positioned at the compression molding station 122.

This is followed by the step of retracting the upper plunger 6 upwardly and unloading the formed pellet 13 from the die 3 by ejecting the pellet 13 out upwardly with the lower plunger 5 as shown in FIG. 3F. By this time, the molding unit 2 is positioned at one of the insert assembly stations 123. Then, the pellet 13 held by the center pin 4 is loaded into the case 124, which has been transferred by the case carrying-in conveyor 130 and is held by the case holding means 126 just above and coaxially with the die 3. After the center pin 4 is lowered to be withdrawn from the pellet 13, the case 124 is filled with the pellet 13 placed on the lower plunger 5.

The case 124 held by the case holding means 126 is then moved back to its retracted position. In the molding unit 2, the pellet 13 is molded according to the steps of procedure shown in FIGS. 3A–3E before being conveyed to another insert assembly station 123. At the next insert assembly station 123, the case holding means 126 is again returned to the movement path of the molding unit 2, so that the second pellet 13 is loaded into the case 124 from below to the previously inserted pellet 13 according to the procedure steps shown in FIGS. 3F and 9, before the case is conveyed to the case carrying-out conveyor 134.

As set forth above, the further embodiment of the present invention is capable of successively forming pellets 13 and inserting the pellets 13 into the case 124 immediately after the forming operation of pellets 13 with a single assembly system, thus being able to continuously producing dry cells filled with two or more pellets 13.

The method of the present invention for molding a powder mixture by compression to form a ring-like pellet such as a cathode pellet for alkaline-manganese dry cells is advantageous for forming a pellet of which inner and outer sides are virtually not tapered and which is uniform in weight and height.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A powder compression molding and assembly system comprising:

a rotary disk;

a plurality of molding units mounted on the rotary disk at spaced circumferential locations, each of said plurality of molding units including a cylindrical die;

a lower plunger;

an upper plunger;

a center pin concentric with said lower plunger for defining an annular space within said die for molding powder into tubular configurations, when one of the plurality of the molding units are moved along a circular path to be aligned between the lower plunger and the upper plunger;

a pair of pressure rollers provided at least at two equally spaced locations on the movement path of the plurality of molding units for pressure engagement with the upper plunger and the lower plunger respectively;

a feed station for loading each cylindrical die with a powder material to be molded by pressure engagement with the upper plunger and lower plunger into a pellet;

a plurality of operating units provided respectively to each of the plurality of molding units and moved along a concentric path with the molding units, for transferring and retractably positioning a case above and in alignment with the cylindrical die of each of the molding units;

a plurality of insertion assembly stations mounted at an appropriate position on a movement path of the molding units for inserting molded pellets into a case operatively positioned outside of and in alignment with the cylindrical die by an operating unit;

a case carrying-in unit for feeding a case to a first insertion assembly station;

a case holding unit for holding and conveying a case loaded with a first molded pellet at the first insertion assembly station to a second insertion assembly station wherein the second insertion assembly station inserts a second molded pellet adjacent the first molded pellet; and a case carrying-out unit for removing a case loaded with the first and second molded pellets, thereby allowing the assembly system to automatically fill a case with a plurality of molded pellets.

2. The powder compression molding and assembly system according to claim 1, further comprising a first cam provided immediately downstream of the pair of pressure rollers in a direction of rotation of the rotary disk, for lifting up the center pin and the lower plunger of the molding unit.

3. The powder compression molding and assembly system according to claim 2 further comprising a stationary second cam provided in coaxial arrangement with the rotary disk, wherein each of said plurality of operating units includes a cam follower for engagement with said second cam.

4. The powder compression molding and assembly system according to claim 3, wherein said stationary second cam comprises a first cam surface for causing the loading units to track the concentric path with the molding units, and a second cam surface for causing the operating units to advance towards between the upper plunger and the lower plunger of the molding units.

5. The powder compression molding and assembly system according to claim 4, wherein each of the operating units comprises an operating lever operatively connected to said cam follower, a support arm connected to said operating lever and rotatably supported on the rotary disk, a case holding member mounted on said support arm, and a convey jig detachably supported on the case holding member, said convey jig supporting the cylindrical container such that an open end of the case faces downwards.

6. The powder compression molding and assembly system according to claim 5, further comprising a support plate for closing and opening the open end of the case to prevent the pellet from falling out of the case.

7. The powder compression molding and assembly system according to claim 1, wherein said pair of pressure rollers are provided at a plurality of locations corresponding to a number of the tubular configurations to be inserted into one case.

8. The powder compression molding and assembly system according to claim 7, wherein the case carrying-in unit further comprising a means for supplying a plurality of cases one after another to each of the operating units, said means for supplying the cases being provided downstream of one of said pressure rollers in a direction of rotation of the rotary disk.

9. The powder compression molding and assembly system according to claim 8, wherein the cases are supplied to the operating units held with respective convey jigs.

10. The powder compression molding and assembly system according to claim 8, wherein the case carrying-out unit further comprising a means for receiving the cases one after another from each of the case holding unit after a predetermined number of pellets have been inserted into the cases, said means for receiving the cases being provided downstream of one of said pressure rollers in a direction of rotation of the rotary disk.

11. A powder compression molding and assembly system according to claim 1, wherein the plurality of insertion assembly stations are provided so that the pellets formed at each of the molding units located between the insertion assembly stations are inserted into the case immediately after the compression molding at the next insertion assembly station.

12. A powder compression molding and assembly system according to claim 1, wherein each of the case holding units is mounted on the rotary disk corresponding to each molding unit and is constructed to hold and retract a case loaded with the first molded pellet at the first insertion assembly station to its retracted position beside the molding unit, and to advance the case adjacent the movement path of the molding units to the next insertion assembly station.

13. A powder compression molding and assembly system according to claim 1, wherein the case is held by a conveyor member, which is conveyed and positioned by the actions of the case carrying-in unit, the case holding unit, and the case carrying-out unit.

14. A powder compression molding and assembly system according to claim 1, wherein the case holding unit is mounted to one end of an operating lever which is mounted on the rotary disk corresponding to each molding unit, the operating lever being rotatably connected to the rotary disk with a cam follower at the other end thereof engaged with a cam disposed coaxially with the rotary disk, the cam having a retraction cam surface for holding the case holding unit at its retracted position beside the molding unit and an operating cam surface for causing the case holding unit to advance to and retract from the movement path of the molding unit.

15. The powder compression molding and assembly system of claim 1 wherein the center pin extends into the dry cell housing container during the ejection of each molded tubular electrode pellet.

16. The powder compression molding and assembly system of claim 15 further comprising a first cam provided immediately downstream of the pair of pressure rollers in a direction of rotation of the rotary disk, for lifting up the center pin and the lower plunger of the molding unit.

17. The powder compression molding and assembly system of claim 16 further comprising a stationary second cam provided in coaxial arrangement with the rotary disk, wherein each of said plurality of operating units includes a cam follower for engagement with said second cam.

18. The powder compression molding and assembly system of claim 17:

wherein said stationary second cam comprises a first cam surface for causing the operating units to track the concentric path with the molding units, and a second cam surface for causing the operating units to advance towards and between the upper plunger and the lower plunger of the molding units.

19. A powder compression molding and assembly system comprising:

a rotary disk;

a plurality of molding units mounted on the rotary disk at spaced circumferential locations, each of said plurality of molding units including a die, a lower plunger;

an upper plunger;

a center pin concentric with said lower plunger for defining an annular space within said die for molding powder into tubular configurations, when one of the plurality of the molding units is moved along a circular path to be aligned between the lower plunger and the upper plunger;

a pair of pressure rollers provided at least at two equally spaced locations on the movement path of the plurality of molding units for pressure engagement with the upper plunger and the lower plunger, respectively;

a feed station for loading each die with a powder material to be molded by pressure engagement with the upper plunger and lower plunger into a pellet;

a plurality of operating units provided respectively to each of the plurality of molding units and moved along a concentric path with the molding units, for transferring and retractably positioning a case above and in alignment with the die of each of the molding units;

a plurality of insertion assembly stations mounted at appropriate positions on a movement path of the molding units for inserting molded pellets into a case operatively positioned outside of and in alignment with the die by an operating unit, the respective molded is pellets are inserted into the case by movement of the lower plungers while the center pins support the respective molded pellet;

a case carrying-in unit for feeding the cases into a first insertion assembly station;

a case holding unit for holding and conveying the cases loaded with a first pellet to a second insertion assembly station wherein the second insertion assembly station inserts a second molded pellet adjacent the first molded pellet in the case; and a case carrying-out unit for removing a case loaded with the first and second molded pellets thereby allowing the assembly system to automatically fill a case with a plurality of molded pellets.

20. The powder compression molding and assembly system according to claim 14, wherein each of the operating units comprises an operating lever operatively connected to said cam follower, a support arm connected to said operating lever and rotatably supported on the rotary disk, and a convey jig detachably supported on the support arm, said convey jig supporting the case such that an open end of the case faces downwards.

21. A powder compression molding and assembly system comprising:

a rotary disk;

a plurality of molding units mounted on the rotary disk at spaced circumferential locations, each of said plurality of molding units including a die, a lower plunger concentric with said cylindrical die;

an upper plunger;

a center pin concentric with said lower plunger for defining an annular space within said die for molding powder into pellets, when one of the plurality of the molding units is moved along the circular path to be aligned between the lower plunger and the upper plunger;

a pair of pressure rollers provided at least at two equally spaced locations on the movement path of the plurality of molding units for pressure engagement with the upper plunger and the lower plunger, respectively;

a feed station for loading each die with a powder material to be molded by pressure engagement with the upper plunger and lower plunger into a pellet;

a plurality of operating units, one operating unit provided respectively to each of the plurality of molding units and moved along a concentric path with the molding units, for transferring and retractably positioning a case member above and in alignment with the die of each of the molding units;

wherein each of the operating units comprises an operating lever operatively connected to a cam follower, a support arm connected to said operating lever and rotatably supported on the rotary disk, a case holding means mounted on said support arm, and a convey jig detachably supported on the case holding means, said convey jig supporting the case member such that an open end of the case member faces downwards; and an insertion assembly station mounted at an appropriate position on a movement path of the molding units for inserting the molded pellet into a case member operatively positioned outside of and in alignment with the die by an operating unit.

22. A powder compression molding and assembly system comprising:

a rotary disk;

a plurality of molding units mounted on the rotary disk at spaced circumferential locations and moved along a circular path, each of said plurality of molding units including a cylindrical die;

a lower plunger;

an upper plunger;

a center pin concentric with said lower plunger for defining an annular space within said cylindrical die for molding powder into pellets, when one of the plurality of the molding units is moved along the circular path to be aligned between the lower plunger and the upper plunger;

a pair of pressure rollers provided at least at two equally spaced locations on the movement path of the plurality of molding units for pressure engagement with the upper plunger and the lower plunger, respectively;

a feed station for loading each cylindrical die with a powder material to be molded by pressure engagement with the upper plunger and lower plunger into a pellet;

a plurality of operating units, one operating unit provided respectively to each of the plurality of molding units and moved along a concentric path with the molding units, for transferring and retractably positioning a case member above and in alignment with the cylindrical die of each of the molding units, wherein each of the operating units comprises an operating lever operatively connected to a cam follower, a support arm connected to said operating lever and rotatably supported on the rotary disk, a case holding unit mounted on said support arm, and a convey jig detachably supported on the case holding unit, said convey jig supporting the case member such that an open end of the case member faces downwards; and an insertion assembly station mounted at an appropriate position on a movement path of the molding units for inserting the molded pellet into a case member operatively positioned outside of and in alignment with the cylindrical die by an operating unit, the molded pellet is inserted into the case member by movement of the lower plunger while the center pin supports the molded pellet.

* * * * *